United States Patent [19]

Lieberman

[11] 4,209,091
[45] Jun. 24, 1980

[54] BUTTON CELL PACKAGE AND METHOD OF MAKING SAME

[75] Inventor: Walter G. Lieberman, Minneapolis, Minn.

[73] Assignee: Gould Inc., Rolling Meadows, Ill.

[21] Appl. No.: 932,733

[22] Filed: Aug. 10, 1978

[51] Int. Cl.² ............................................. B65D 85/30
[52] U.S. Cl. ..................................... 206/333; 53/396; 206/460; 206/470; 206/523; 206/591
[58] Field of Search ............... 206/333, 460, 467, 468, 206/470, 521, 523, 588, 589, 591, 594, 813

[56] References Cited

U.S. PATENT DOCUMENTS

| T 896,007 | 3/1972 | Rap Elements | 206/333 X |
|---|---|---|---|
| 1,813,256 | 7/1931 | Radkus | 206/523 |
| 1,980,141 | 11/1934 | MacGregor | 206/364 |
| 2,282,908 | 5/1942 | Thompson | 206/523 |
| 2,737,290 | 3/1956 | Volckening et al. | 206/521 |
| 2,911,318 | 11/1959 | Lerch | 428/356 |
| 3,433,351 | 3/1969 | Zaborney | 206/333 |
| 3,463,309 | 8/1969 | Szostek | 206/470 |
| 3,491,914 | 1/1970 | Elzey | 206/523 X |
| 3,708,946 | 1/1973 | Cahill | 206/523 X |
| 3,944,069 | 3/1976 | Eldridge, Jr. | 206/460 X |
| 4,015,708 | 4/1977 | Kelm | 206/333 |

FOREIGN PATENT DOCUMENTS 1462407 12/1966 France ..................................... 206/523

*Primary Examiner*—Stephen Marcus
*Attorney, Agent, or Firm*—Augustus J. Hipp; Timothy H. Gens

[57] ABSTRACT

A button cell package in which button cells are releasably retained in position by an adhesive surface layer on a laminated structure having a resilient layer between the adhesive layer and a nonresilient base. An additional layer having preferential barrier properties is used with cells of the metal-air type and is located between the adhesive surface layer and the resilient member. The adhesive layer seals the metal-air cell to increase cell shelf life and prevents inadvertent dislodgment and loss of cell capacity, yet permits small amounts of evolved hydrogen to diffuse from the cell. The resilient layer serves as a cushion and provides a means for obtaining maximum surface contact between the adhesive surface layer and the button cell surface to maintain the cell in impact-resistant, releasable adhesive contact with the adhesive layer. The method of assembling the package is also described.

18 Claims, 6 Drawing Figures

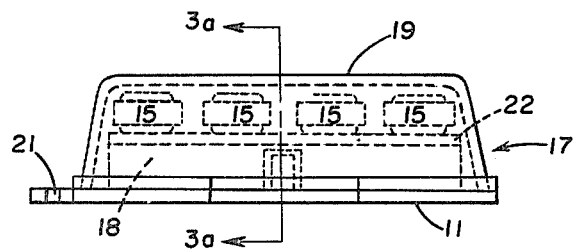
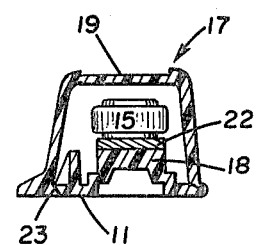
FIG.3        FIG.3a
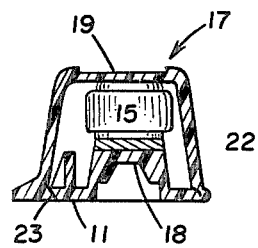
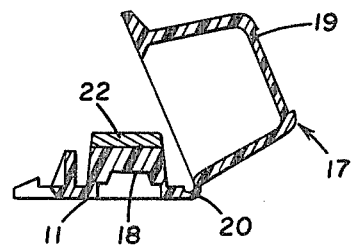
FIG.3b        FIG.4

BUTTON CELL PACKAGE AND METHOD OF MAKING SAME

BACKGROUND OF THE INVENTION

1. Field of the Invention

The present invention relates to an improved package and method for making same for packaging electrical button cells in general and more particularly concerns an impact-resistant handling, shipping and storage package, especially for electric button cells of the metal-air type wherein such cells are packaged to maintain the cells in a sealed condition throughout subsequent handling, shipping and storage.

2. Description of the Prior Art

Packaging devices for button cells are known. U.S. Pat. No. 4,015,708 (assigned to the same assignee as the present invention) describes a storage and merchandising package for battery cells in which cells, such as zinc-air cells, are inserted in apertures and adhesively held against a backing material which, in the preferred embodiment, for zinc-air cells, has preferential barrier properties to extend the shelf life of the cells. The package includes an openable cover which surrounds the cells to prevent accidental shorting or physical dislodgment thereof.

While the various packaging and storage devices of the prior art all provide some advantage over previous configurations, none has solved the problem of providing a package for all types of button cells, including zinc-air button cells, in a manner which provides easy access to the button cells by persons lacking in physical dexterity and of providing an impact-resistant package which may be embodied in a variety of packaging configurations.

The aforementioned patent is directed to a button cell package which has a flat first layer of material having a plurality of apertures dimensioned to receive respective button cells therein. For releasably retaining the button cells in the apertures, a second layer of backing material is laminated to the first layer with pressure-sensitive adhesive on the backing material exposed in the areas underlying the apertures. During packaging, the button cells are firmly pressed against the exposed pressure-sensitive adhesive areas on the backing material. To prevent excessive flexing of the backing material, particularly in the apertures or window areas, the first layer is preferably made of a relatively rigid material, such as card stock, to thereby stiffen the backing material. This substantially precludes warpage of the backing material which tends to separate the exposed adhesive areas from the button cells. Moreover, the first layer and/or the backing material may be formed of a blotter-like material to absorb electrolyte which may leak from the cell. The patent also discloses that the adhesive itself can serve as the barrier member. In that case, the backing material can be made of a gas permeable material such as another layer of paper board or card stock material similar to the first layer.

While the preferred backing material of the referenced patent is a thin polyester plastic film, such as "Mylar", sold by E. I. duPont de Nemours, the packaging has no resilient layer or member in the laminate, nor does the alternative embodiment provide for a resilient layer or member in the laminate. Thus, when the button cells is pressed into the receiving apertures, the button cell surface area in contact with the adhesive layer is dependent upon the compressibility or resiliency of the backing material and upon the shape of the button cell contact surface. Thus, inconsistent and unpredictable degrees of adherence result between the button cell and the adhesive layer when the cell is compressed against the relatively incompressible paper board or card stock. This may result in cells inadvertently separating from the adhesive layer and, in the case of metal-air cells which depend upon good adherence to the adhesive layer to maintain the cell in a sealed condition, will prematurely reduce cell shelf life as the result of oxygen, carbon dioxide or moisture in the air entering the cell, or moisture escaping from the cell, resulting in the possibility of a dead cell when subsequently placed in service by the consumer.

Previous button cell packaging configurations are not readily adaptable for packaging all types of button cells and are generally unacceptable from the viewpoint of cell accessibility and ease of cell removal, or are unacceptable because cells may easily become dislodged and lost during handling or shipping and do not adequately protect metal-air cells to prevent inadvertent and premature loss of cell capacity.

The present invention greatly reduces the possibility of a button cell becoming inadvertently dislodged or lost, or, in the case of a metal-air cell, premature loss of cell capacity. This is accomplished by utilizing a laminated structure which includes a resilient member between a pressure-sensitive adhesive surface layer and a nonresilient base member. When the button cell is pressed onto the adhesive layer, the resilient member serves as a cushion and deforms or yields to the shape of the button cell contact surface to maximize the contact area between the cell contact surface and the adhesive surface layer, thus providing a reproducible and reliable adhesive contact between the cell and the adhesive layer, regardless of the shape of the button cell contact surface. The present invention also provides a basic button cell package which has sufficient impact resistance to withstand rough handling without cell dislodgement, thereby permitting button cells of any type to be commercially packaged in a wide variety of package or housing configurations, including reclosable housing configurations which provide easy access to and removal of the individual cells by persons lacking in physical dexterity.

SUMMARY OF THE INVENTION

The button cell package of the present invention comprises a housing means, a laminated assembly or structure attached to the housing means and comprising a substantially flat base, which may be a part of the housing means, a resilient member attached to the base member, a barrier film attached to the resilient member and having preferential gas barrier properties, and a pressure-sensitive adhesive layer attached to the barrier film and having preferential button cell adherence and release properties. In packaging metal-air button cells, the surface of the button cell having the air-access opening therein is pressed onto the adhesive layer with sufficient pressure to cause the resilient member to deform to maximize the area of adhesive contact between the button cell and the adhesive layer and to seal the air-access opening to prevent entry of air into the cell. The adhesive contact formed between the adhesive layer and the button cell is sufficiently strong and impact-resistant to prevent inadvertent cell dislodgement and premature loss of cell capacity during handling (including subsequent packaging), shipping and storage, and assures a fresh cell when the cell is peeled from the adhesive by the consumer and placed in service. In packaging button cells other than of the metal-air type, the cell, without regard for which cell surface is selected as the adhesive contact surface, is pressed onto the adhesive surface as above described. Thus, the present invention may be used for all types of button cells and may be incorporated economically in a variety of packaging configurations for commercially packaging individual cells as well as for a plurality of button cells, such as in reclosable, blister or shrink packages.

Accordingly, it is a primary object of the present invention to provide an improved, economical and convenient impact-resistant package for button cells of all types and which package is particularly effective for preserving cell shelf life during handling, shipping and storing of metal-air type cells.

It is also an object to provide a package configuration which affords ease of access to the individual cells by persons lacking in physical dexterity.

Yet another object is to provide a button cell package which may be made economically and in a variety of housing configurations for packaging single or multiple cells on a commercial basis to meet market and consumer requirements.

Another object is to provide an improved package for metal-air button cells which permits evolved hydrogen to escape from the cell during handling, shipping and storage and which retains the cell in a sealed state until placed in service by the end user.

Yet another object is to provide an improved package which maximizes the surface contact and adherence between the button cell and the adhesive layer to reduce the possibility of inadvertent cell dislodgement and, in the case of metal-air cells, resultant premature loss of cell capacity as the result of air entering the cell.

Other objects and advantages of the invention will become apparent upon reading the following detailed description and upon reference to the drawings.

BRIEF DESCRIPTION OF THE DRAWINGS

Further details of the invention are explained below with the aid of the examples set forth in the attached drawings in which:

FIG. 3 is a front view of the package shown in FIG. 2;

FIG. 3a is a cross-sectional view of the package seen in the plane of line 3a—3a in FIG. 3;

FIG. 3b is a cross-sectional view of an alternate embodiment of the package shown in FIG. 3 and FIG. 3a with a larger button cell showing the relationship of the components of the package;

FIG. 4 is a cross-sectional view of a typical package (without cells) as shown in FIGS. 2, 3, 3a and 3b showing details of the plastic hinge connecting the cover to the base of the housing.

DESCRIPTION OF THE PREFERRED EMBODIMENT

Figure 1:
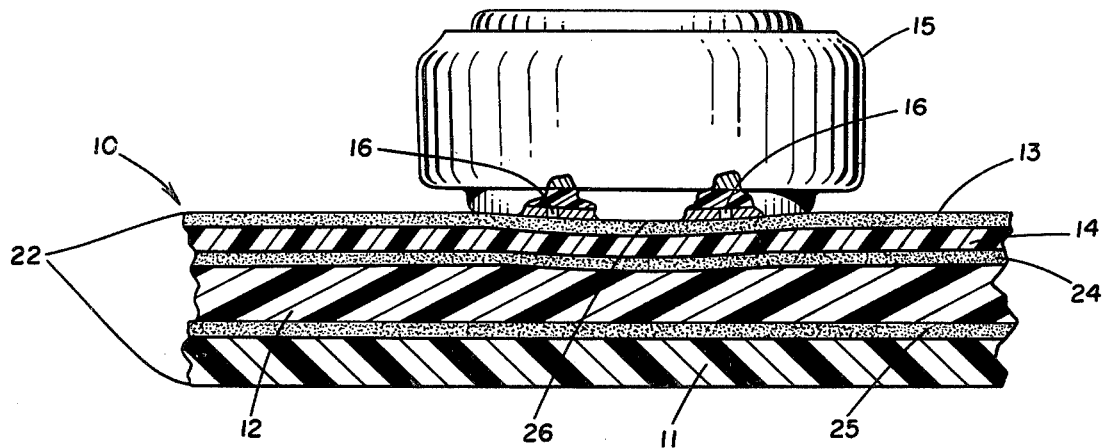
FIG. 1 is an enlarged cross-sectional view of the package structure of the present invention, showing a metal-air button cell positioned on the laminated structure of the present invention.

In the drawings, details of the preferred embodiment of the present invention are best illustrated in FIG. 1 in which the handling, shipping and storage package 10 for button cells comprises in combination housing means (not shown), a laminated assembly or structure 22 which comprises a substantially flat base member 11, which may be part of the housing means, a resilient member 12 attached to said base member, a barrier film 14 attached to said resilient member, and a pressure-sensitive adhesive layer 13, having preferential button cell adherence and release properties, overlying and attached to said barrier film and having an exposed adhesive surface for receiving a button cell; and a metal-air button cell 15 with one surface 26 thereof, having air-access openings 16 therein, in releasable adhesive contact with the exposed adhesive surface of adhesive layer 13. Any type of button cell may be packaged in the package of the present invention; however, for purposes of illustration, a metal-air cell is shown. In the preferred embodiment illustrated, the resilient member 12 overlies and is attached or laminated to the substantially flat base member 11 by an adhesive layer 25 which may be any adhesive or other attaching means compatible with the materials used for the base member 11 and resilient member 12. Likewise, the barrier film 14 overlies and is attached or laminated to resilient member 12 by an adhesive layer 24 which may be the same as adhesive 25 used in attaching the base and resilient members 11 and 12 respectively, or other attaching means may be employed. The selection of adhesives 24 and 25 is not critical and need only be selected to be compatible with the respective base member 11, resilient member 12 and barrier film 14 being attached and with the added condition that adhesive 24 should not form a stiff or brittle layer between the barrier film 14 and the resilient member 12 upon drying or curing as this could impair hydrogen diffusion as hereinafter described in detail as well as the resiliency of resilient member 12 and also reduce or impair the adherence of cell 15 to the exposed surface of adhesive layer 13 overlying and attached to the barrier film 14. In the preferred embodiment, styrene butadiene rubber adhesive which is commercially available is used for both adhesives 24 and 25.

The substantially flat base member 11 is preferably made of a material which is sufficiently stiff to prevent excessive flexure of the resilient member 12, barrier film 14 and adhesive layer 13 which could, when flexed excessively, cause the adhesive member 13 to partially or completely separate from the attached button cell 15, thereby resulting in inadvertent cell dislodgement and premature loss of cell capacity.

Figure 2:
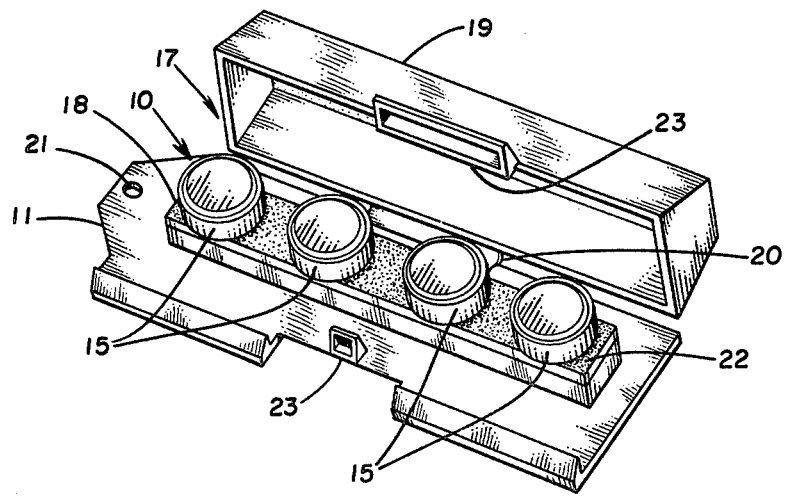
FIG. 2 is a perspective view of the preferred embodiment of the button cell package containing a plurality of button cells.

Preferably, the substantially flat base member 11 is made from polypropylene having a thickness on the order of 0.1524 cm. (0.060 in.), but may be thicker or thinner, as desired. The base member 11 may be of other material such as polyethylene, styrene or other plastics well known to those skilled in the art, such as acrylonitrile butadiene styrene (ABS), etc., and may comprise part of a housing means (not shown) upon which the resilient member 12 is attached. The wide selection of materials for base member 11 gives the invention great versatility and permits the package 10 to be incorporated into various housing configurations for single or multiple cell packaging to meet market and consumer demand. Likewise, this versatility also permits the package to be blister or shrink packaged or formed into a variety of other housing configurations, including reclosable housings, as shown in FIG. 2; such package configurations may use materials other than plastic, such as card stock or the like, to serve as base member 11.

In the preferred embodiment, the resilient member 12 is formed from polyethylene foam such as "Fasmount" 2132 sold by Fasson Industrial Division of Avery International Corporation. The foam is made with top and bottom adhesive layers 24 and 25 of the styrene butadiene rubber adhesive previously described. Resilient member 12, having thicknesses of 0.0813 cm. (0.032 in.), 0.1168 cm. (0.046 in.) and 0.3175 cm. (0.125 in.) were tested and all were found to be acceptable; however, based upon economics, the thinner member is preferred. The thickness of resilient member 12 is not critical and no limitation is intended by specifying acceptable thicknesses as a thicker or thinner member may be utilized, provided the member is sufficiently resilient or compressible to yield or deform to accommodate the cell contact surface and form the desired adhesive seal and adhesive contact, and is sufficient porous to permit the small amount of evolved hydrogen from the cell to diffuse therethrough when packaging metal-air type cells. Natural urethane foam, such as "Scotch-Mount," sold by The Minnesota Mining and Manufacturing Co. (3M Co.), having top and bottom adhesive layers 24 and 25 of styrene butadiene rubber, is also usable for the resilient member 12, but is less desirable economically; it is also more dense than polyethylene foam and is tougher and stronger and is thus preferred for use in applications when barrier film 14 is not used. Other materials having acceptable porosity and resiliency characteristics, such as rubber, may also be used for resilient member 12. For packaging metal-air type button cells, the selection of the material for resilient member 12 should be made to ensure that the resilient member will permit small amounts of evolved hydrogen to diffuse therethrough and will deform or yield to conform to the shape of the button cell surface 26 which is in contact with pressure-sensitive adhesive layer 13 when the cell is pressed onto the adhesive layer 13, thus ensuring that maximum surface contact between the button cell surface 26 and the adhesive layer 13 is established, regardless of the fact that the button cell surface may be other than a flat surface. Without the resilient member 12, insufficient surface contact between the button cell surface 26 and the adhesive layer 13 is established to assure that the benefits of the present invention are obtained and chances of inadvertent cell dislodgement and, in the case of a metal-air cell, premature loss of cell capacity are greatly increased. By obtaining the maximum surface contact between the button cell surface 26 and the adhesive layer 13 when the cells are pressed onto adhesive layer 13, subsequent handling of the button cells in completing the packaging may be accomplished with ease and without inadvertent cell dislodgement. For instance, the cells may be packaged in a configuration as shown in FIG. 1, wherein the base member 11 serves as a base for subsequent blister or shrink packaging, or may form part of the base of a reclosable package housing as shown in FIG. 2.

In test packaging of metal-air cells, the resilient member 12 (along with adhesive layer 25) was omitted from the configuration shown in FIG. 1. A polypropylene base member 11, having a thickness of 0.1524 cm (0.060 in.) was used and a polyester barrier film 14, having a pressure-sensitive adhesive layer 13 and bottom adhesive layer 24 was laminated to the base member 11. Metal-air cells of the zinc-air type were pressed onto the exposed surface of adhesive layer 13 and the cell-to-adhesive adherence was checked to determine the effects of hydrogen gas evolved from the cells as the result of reaction between the zinc anode and the potassium hydroxide electrolyte in the cell. Inspection showed that the cells separated from the adhesive layer 13 because the small amounts of hydrogen generated in the cells could not diffuse through the polypropylene base member 11 after diffusing through adhesive layer 13, polyester barrier 14 and adhesive layer 24, hence the hydrogen gas created a pressure increase sufficient to cause the cells to partially separate from the adhesive layer 13. This partial separation of the cell from the sealing adhesive layer permits the cells to lose capacity as the result of small amounts of oxygen and carbon dioxide entering the cell and water entering or migrating from the cell. Thus, the resilient member 12 serves a multipurpose function for packaging button cells of the metal-air type by providing a deformable or yieldable surface which conforms to the shape of the button cell contact surface to ensure maximum adhesive contact between the button cell 15 and the adhesive layer 13 and seals the cell when the button cell is pressed onto the adhesive layer; as the result of its porous structure, it provides a diffusion path for diffusing the small amounts of hydrogen gas evolved from the button cells and it also serves as a cushion to reduce the impact effects upon the cell adhesive seal. Thus, the use of resilient member 12 in laminated assembly or structure 22 provides a basic button cell package for all types of button cells and the improved impact resistance and adherence of the button cells to the adhesive layer 13 permits the packaging of the button cells in a wide variety of housing configurations, such as reclosable packages as well as blister and shrink packages.

In the preferred embodiment, the barrier film 14 is attached to underlying resilient member 12 by adhesive layer 24, previously described. It is well known by those skilled in the art that metal-air cells, such as those of the zinc-air type, lose capacity by oxygen in the air entering the cell and reacting chemically with the zinc; they also evolve small amounts of hydrogen during storage, have a tendency to lose or gain moisture subject to the environmental humidity conditions and are subject to carbon dioxide entering the cell and reacting with the alkaline electrolyte to form carbonates and bicarbonates thereby depleting the available electrolyte in the cell and reducing cell performance. Thus, the barrier film 14 should be pervious to small amounts of hydrogen and substantially impervious to other gases and should be selected to control these conditions to the degree which gives a satisfactory and acceptable cell shelf life, i.e. the barrier film should be pervious to hydrogen at low rates and be substantially impervious to oxygen, carbon dioxide and moisture so that the transfer of these components is reduced to acceptable low rates. The barrier film 24 is preferably a polyester film, such as "Mylar," sold by E. I. duPont de Nemours. A Mylar film having a thickness on the order of 0.0051 cm. (0.002 in.) is satisfactory for the barrier film 14 and also possesses the above described desirable barrier properties to substantially completely seal the air-access openings 16 of button cell 15 and to enhance the shelf life of the metal-air button cells which require air-access opening 16 for proper operation but which must be substantially completely sealed during storage. The transmission of evolved hydrogen from the cell 15 through the adhesive layer 13, the barrier film 14, adhesive layer 24 and into resilient member 12 prevents pressure buildup between the cell and the adhesive layer to the level which could cause separation or dislodgement of the cell from the adhesive layer 13 and result in inadvertent and premature loss of cell capacity. The barrier properties of Mylar, with respect to ingress into the cell of oxygen, carbon dioxide and moisture, substantially extends the shelf life of the cells 15 in the stored condition.

For applications in packaging button cells of other than the metal-air type which require no sealing of the cell to prevent air ingress, such as nickel-cadmium, zinc-mercury oxide and zinc-silver oxide type cells, the barrier film 14, along with adhesive layer 24, may be omitted without any detrimental effect in packaging the cells, as the cells will still form the desired maximum adhesive contact between the cell contact surface 26 and the adhesive layer 13 and provide an impact-resistant package as previously described.

Likewise, it is envisioned that a thicker barrier film may be used and the resilient member 12 omitted. In such event, the barrier film selected should have the aforementioned desirable barrier properties adequate to permit diffusion of small quantities of hydrogen from the cell, as previously described, and be sufficiently resilient to serve as a cushion and to deform or yield to conform to the cell contact surface to thereby maximize the adhesive contact between the cell contact surface 26 and the adhesive layer 13.

The adhesive layer 13 is preferably a pressure-sensitive silicone base type adhesive such as used on either No. 8402 or No. 8403 tape sold by 3M Co. and typcially have thicknesses on the order of 0.0025 cm. (0.001 in.) and 0.0038 cm. (0.0015 in.) respectively, although thicknesses on the order of 0.0025 cm. (0.001 in.) to 0.0076 cm. (0.003 in.) are acceptable; however, the thickness of the adhesive layer 13 does not appear to be critical so long as the desired adhesion between adhesive and cell and the seal of the air-access openings are obtained when the metal-air cell is pressed onto the adhesive layer, and the adhesive peels cleanly and completely from the cell when it is removed from the adhesive layer, thus no limitation is intended by specifying such typical adhesive thicknesses. The adhesive layer 13 permits hydrogen to escape from the air-access openings 16 of button cell 15 and to diffuse through adhesive layer 13 and barrier film 14. It is important that adhesive layer 13 releasably adhere to cell 15 during handling, shipping and storage and strip or peel cleanly and completely from the cell when it is removed from the package in order to ensure that the terminal of the cell has good electrical contact characteristics and, in the case of metal-air cells, to obviate the problem of accidental blockage of the air-access openings 16 in cell 15 with adhesive material.

The metal-air button cells 15 may be of any type which require oxygen ingress for normal operation; however, the present invention may be advantageously employed for handling, shipping and storing other types of button cells when desired. Metal-air button cells typically have one or more air-access openings 16 in only one surface 26 of the cell. In order to provide acceptable shelf life for these latter type cells, it is necessary to seal the air-access openings until the cells are placed in service by the consumer. The present invention provides an effective, economical, versatile and commercially practicable package for sealing such cells at the point of manufacture and maintaining the sealed condition throughout subsequent handling, shipping and storage of the cells to provide a factory-fresh cell to the consumer upon removal of the cell from the package. One of the important advantages of the subject invention lies in the fact that the button cell surface 26, which is in sealing, yet releasable, adhesive contact with the adhesive surface of the adhesive layer 13, may be other than a flat or substantially flat configuration. For example, as seen in FIG. 1, button cell 15 may have a surface 26 which is slightly conical; however, when the button cell 15 is pressed onto adhesive layer 13, the adhesive layer 13, barrier layer 14 and resilient member 12 will deform or yield to conform to the shape of button cell surface 26 and maximize surface contact between button cell surface 26 and adhesive layer 13 to seal the air-access openings 16 of button cell 15 and to provide the desired releasable adhesive contact with the adhesive layer 13. The maximum surface contact thus obtained between button cell surface 26 and adhesive layer 13 provides a releasable adhesive contact which is highly impact-resistant and effective in preventing cell 15 from becoming dislodged, even upon rough handling of the package as normally encountered in subsequent handling, packaging and shipping of such cells.

Button cells packaged in accordance with the present invention may literally be tossed across the room without cells becoming dislodged. Thus, the high impact resistance of the button cell package of the present invention provides an effective protection to prevent metal-air cells from becoming inadvertently dislodged, resulting in premature loss of cell capacity, and the cells will remain sealed in releasable adhesive contact with the adhesive layer throughout handling, shipping and storage to extend substantially the shelf life of the cells and to provide a factory-fresh cell to the consumer upon removal of the cell from the package. Likewise, such cells packaged in accordance with the present invention will retain their shelf life and remain effectively protected from inadvertent dislodgement and premature loss of cell capacity when carried in purses or pockets of the consumer and will remain sealed until removed from the package by the consumer.

Returning to the drawings, FIG. 2 shows additional features of the preferred packaging embodiment of the present invention. In this embodiment, housing means 17 is provided for the impact-resistant package 10 and comprises a substantially flat base member 11, a raised portion of the base member in the form of a pedestal 18, cover member 19, plastic hinge 20, hole 21 in base member 11, laminated assembly or structure 22 (see FIG. 1 for details) and housing fastening means 23. The housing means 17 is integrally molded from a plastic material, preferably from polypropylene, but may be molded from polyethylene if desired. By integrally molding the housing member 17 from polypropylene or polyethylene, the cover member 19 is joined to the base member 11 by a plastic strip 20 which serves as a flexible plastic hinge. Also molded into the cover member 19 and base member 11 are mating fastening means 23 in the form of a snap lock. Thus, the integrally molded housing 17, having a plastic hinge and fastening means, provides a reclosable housing. Hole 21 is provided in base member 11 for displaying or storing the package in a hanging position if desired. In this preferred embodiment, base member 11 is molded to form a raised portion or pedestal 18 which in this configuration serves as base member 11 of the laminated assembly 22 shown in FIG. 1. The remaining components of laminated assembly 22 are prelaminated and attached to the surface of pedestal 18 by adhesive 25. Preferably, the width of the laminated assembly, including pedestal 18, is smaller than the diameter of button cell 15 so that the cell will extend over the edge of the laminated assembly. The positioning of the cells on the raised pedestal 18, combined with the cells 15 extending over the edge of the laminated assembly, provides a packaging configuration which places the cells 15 in a position for easy access and removal of the selected cell from the package. This is especially advantageous for persons lacking in physical dexterity and provides a simple, yet convenient, efficient and practical means for packaging button cells.

FIGS. 3 and 3a show additional details of the preferred embodiment of housing 17 and the relationship between housing 17 and button cells 15. As seen in FIG. 3a, cover 19, when closed, is not in physical contact with the top of button cell 15, thus no pressure is exerted by cover 19 on cell 15 to maintain the cell 15 in position and in sealed, releasable contact with adhesive layer 13. Small button cells of the size typically used for hearing aids, watches, etc. do not require pressure to be exerted upon the cells by the cover 19 when the cover is in the closed position in order to prevent inadvertent dislodging of the cells and subsequent loss of cell capacity, as the releasable adhesive contact provided between button cell surface 26 and the adhesive layer 13 alone is adequate to accomplish the desired end. In packaging such button cells, however, the housing 17 may be so designed that the cover 19, when in the closed position, physically contacts cell 15 and exerts pressure on cell 15 to assist in holding the cell in position and maintain the adhesive contact between cell 15 and adhesive layer 13. This latter housing configuration is shown in FIG. 3b and is the preferred housing configuration for use in packaging button cells larger than those mentioned above. Other housing configurations may, of course, also be used to accomplish the same purpose of placing pressure on the cell to maintain the adhesive contact between cell 15 and the adhesive layer 13.

FIG. 4 shows the various components of the housing means 17, as previously described, and in addition, shows the plastic hinge 20 located between the cover member 19 and base member 11 of the integrally molded housing 17.

Other housing means may also be used, for example, two-piece plastic housing members may be molded from the same materials as above mentioned. Other suitable plastics which may be used for the housing means are styrene and ABS and other plastics which are well known to those skilled in the art. Likewise, the invention is readily adaptable to various housing configurations which may be designed to accommodate single or multiple cells and which may be packaged in blister or shrink packages.

In assemblying the button cell package of the present invention, housing means 17 is provided and placed in an open, upright position in a jig on a conveyor line with the housing base member 11 having pedestal 18 in position to receive the remaining portion of laminated structure or assembly 22 which remaining portion consists of resilient member 12 precoated on both sides with a rubber base adhesive 24 and 25 and to which is laminated barrier film 14 which is precoated on the upper surface with silicone adhesive layer 13. Laminated assembly 22 is formed by attaching the precoated barrier film 14 to the adhesive layer 24, located on the upper surface of the resilient member 12, so that the surface of the pressure-sensitive silicone adhesive layer 13 remains exposed to receive the button cells, cutting the laminate to the desired length and attaching the laminate to the upper surface of pedestal 18 by the rubber base adhesive 25 on the lower surface of resilient member 12. A plurality of metal-air button cells are provided and automatically fed into position and pressed onto the silicone adhesive layer 13 with the button cell surface 26 having the air-access openings 16 in contact with adhesive layer 13. Pressure on the order of 70 to 700 gm/cm$^2$ (1 to 10 psi) is applied vertically to each button cell to depress the button cells 15 downward in order to compress the resilient member and thereby maximize the contact area between button cell surface 26 and adhesive layer 13. This pressure step simultaneously seals the cell against the adhesive layer 13 and forms the releasable adhesive contact which gives the packaged cells the requisite impact resistance to prevent inadvertent cell dislodgment and loss of cell capacity during handling (including additional package if desired), shipping and storage. After the pressure step, the housing cover 19 is then automatically closed and the package is ejected from the packaging line, thereby completing the operation.

While the invention has been disclosed in detail in connection with certain preferred embodiments, it is clear that the invention is easily adaptable to numerous configurations and embodiments, and it will be understood that I do not intend to limit the invention to those embodiments shown. On the contrary, I intend to cover all alternatives, modifications and equivalents as may be included within the spirit and the scope of the invention as defined by the appended claims.

I claim as my invention:

1. A package for button cells, comprising in combination:
    (a) housing means having a base member and a cover member cooperating therewith;
    (b) a laminated assembly comprising: said base member; a resilient member attached to and overlying said base member; a barrier film attached to and overlying said resilient member; and a pressure-sensitive adhesive layer attached to and overlying said barrier film and having an exposed surface for receiving a button cell; and
    (c) a button cell in releasable adhesive contact with the exposed surface of said adhesive layer whereby the profile of said button cell is better accommodated by the resilient member.

2. A package as defined in claim 1, wherein said housing means comprises a reclosable plastic housing.

3. A package as defined in claim 2, wherein said button cell is a metal-air cell having at least one air-access opening in one surface thereof.

4. A package as defined in claim 3, wherein said pressure-sensitive adhesive layer and said barrier film cover said air-access opening permitting the passage of hydrogen therethrough but being substantially impermeable to the passage of oxygen, carbon dioxide and water vapor.

5. A package as defined in claim 1, wherein said pressure-sensitive adhesive is a silicone base adhesive.

6. A package as defined in claim 1, wherein said resilient member is a polyethylene foam material.

7. A package as defined in claim 1, wherein said housing means comprises a blister package.

8. A package as defined in claim 1, wherein said barrier film is a polyester material.

9. A package as defined in claim 1, wherein said base member has a raised portion and said laminated assembly is mounted upon said raised portion.

10. A package for button cells, comprising in combination:
   (a) housing means having a base member and a cover member cooperating therewith;
   (b) a laminated assembly comprising: said base member; resilient means attached to and overlying said base member; a pressure-sensitive adhesive layer attached to and overlying said resilient means and having an exposed surface for receiving a button cell; and
   (c) a button cell in releasable adhesive contact with the exposed surface of said adhesive layer whereby the profile of said button cell is better accommodated by the resilient member.

11. A package as defined in claim 10, wherein said button cell is a metal-air cell having at least one air-access opening in one surface thereof, said pressure-sensitive adhesive layer and said resilient means cover said air-access opening permitting the passage of hydrogen therethrough but being substantially impermeable to the passage of oxygen, carbon dioxide and water vapor.

12. A package as defined in claim 10, wherein said base member has a raised portion and said laminated assembly is mounted upon said raised portion.

13. A package for button cells, comprising in combination:
   (a) housing means having a base member and a cover member cooperating therewith;
   (b) a laminated assembly comprising: said base member; a resilient member attached to and overlying said base member; a barrier film attached to and overlying said resilient member; and a pressure-sensitive layer attached to and overlying said barrier film and having an exposed surface for receiving a button cell: said base member having a raised portion and said laminated assembly mounted upon said raised portion, the width of said laminated assembly and said raised portion being smaller than the diameter of said button cell; and
   (c) a button cell in releasable adhesive contact with the exposed surface of said adhesive layer.

14. A package for button cells, comprising in combination:
   (a) housing means having a base member and a cover member cooperating therewith;
   (b) a laminated assembly comprising: said base member; resilient means attached to and overlying said base member; a pressure-sensitive adhesive layer attached to and overlying said resilient means and having an exposed surface for receiving a button cell; said base member having a raised portion and said laminated assembly mounted upon said raised portion, the width of said laminated assembly on said raised portion being smaller than the diameter of said button cell; and
   (c) a button cell in releasable adhesive contact with the exposed surface of said adhesive layer.

15. A method of packaging a button cell to prevent inadvertent cell dislodgement during handling, shipping and storage, comprising the steps of:
   (a) providing a housing member having a base member and a cover member cooperating therewith;
   (b) forming a laminated structure comprising: said base member; a resilient member attached to and overlying said base member; a barrier film attached to and overlying said resilient member; and a pressure-sensitive adhesive layer attached to and overlying said barrier film and having an exposed surface for receiving a button cell;
   (c) providing a button cell;
   (d) pressing said button cell into adhesive contact with said exposed adhesive surface whereby the profile of said button cell is better accommodated by the resilient member; and
   (e) closing said cover member.

16. A method of packaging a button cell as defined in claim 15, wherein said button cell is a metal-air cell having at least one air-access opening in one surface thereof and said cell surface is pressed into adhesive contact with said exposed adhesive layer.

17. A method of packaging a button cell to prevent inadvertent cell dislodgement during handling, shipping and storage, comprising the steps of;
   (a) providing a housing member having a base member and a cover member cooperating therewith;
   (b) forming a laminated structure comprising: said base member; resilient means attached to and overlying said base member; a pressure-sensitive adhesive layer attached to and overlying said resilient means and having an exposed surface for receiving a button cell;
   (c) providing a button cell;
   (d) pressing said button cell into adhesive contact with said exposed adhesive surface whereby the profile of said button cell is better accommodated by the resilient member; and
   (e) closing said cover member.

18. A method of packaging a button cell as defined in claim 17, wherein said button cell is a metal-air cell having at least one air-access opening in one surface thereof, said pressure-sensitive adhesive layer and said resilient means cover said air-access opening permitting the passage of hydrogen therethrough but being substantially impermeable to the passage of oxygen, carbon dioxide and water vapor.

* * * * *